US012007721B2

(12) United States Patent
Tajima et al.

(10) Patent No.: US 12,007,721 B2
(45) Date of Patent: Jun. 11, 2024

(54) TIMEPIECE AND TIMEPIECE CASE

(71) Applicant: CASIO COMPUTER CO., LTD., Tokyo (JP)

(72) Inventors: Chieko Tajima, Kodaira (JP); Hajime Iguchi, Fuchu (JP); Kazuma Kobayashi, Fuchu (JP)

(73) Assignee: CASIO COMPUTER CO., LTD., Tokyo (JP)

(*) Notice: Subject to any disclaimer, the term of this patent is extended or adjusted under 35 U.S.C. 154(b) by 182 days.

(21) Appl. No.: 17/834,347

(22) Filed: Jun. 7, 2022

(65) Prior Publication Data

US 2022/0397866 A1 Dec. 15, 2022

(30) Foreign Application Priority Data

Jun. 9, 2021 (JP) ................................ 2021-096882

(51) Int. Cl.

*G04B 39/02* (2006.01)
*G04B 37/00* (2006.01)
*G04B 37/08* (2006.01)

(52) U.S. Cl.

CPC ........... *G04B 39/025* (2013.01); *G04B 37/00* (2013.01); *G04B 37/08* (2013.01)

(58) Field of Classification Search

CPC ....... G04B 39/025; G04B 37/00; G04B 37/08
See application file for complete search history.

(56) References Cited

U.S. PATENT DOCUMENTS

| | | | | |
|---|---|---|---|---|
| 4,234,948 A * | 11/1980 | Maekawa | G04B 39/02 368/294 |
| 4,322,834 A * | 3/1982 | Schaeren | G04B 39/02 368/296 |
| 6,208,591 B1 * | 3/2001 | Sakurazawa | G04B 19/30 313/110 |
| 9,718,399 B2 * | 8/2017 | Nirei | B60Q 3/14 |
| 10,345,760 B2 * | 7/2019 | Kayano | G04B 39/02 |

(Continued)

FOREIGN PATENT DOCUMENTS

| | | |
|---|---|---|
| JP | S57108185 U | 7/1982 |
| JP | S5837586 U | 3/1983 |
| JP | 2006105654 A | 4/2006 |

*Primary Examiner* — Edwin A. Leon
*Assistant Examiner* — Sean R Brannon
(74) *Attorney, Agent, or Firm* — Scully, Scott, Murphy & Presser, P.C.

(57) ABSTRACT

A timepiece includes: a casing; a light transmission part; a function part; and a glue adhering the light transmission part to the casing. The casing includes: a projection projecting from an inner circumferential surface and extending along a circumferential direction; and a protrusion protruding from the inner circumferential surface and determining a position of the light transmission part. A lateral surface of the light transmission part is adhered to the inner circumferential surface. A peripheral part of a bottom surface of the light transmission part is adhered to a top surface of the projection. An outer circumferential surface of the function part extends along an inner surface of the projection. A space is present in a facing region where the projection faces the function part along the light transmission part. The space is wider in a specific section including the protrusion than in a section different from the specific section.

14 Claims, 5 Drawing Sheets

(56) References Cited

U.S. PATENT DOCUMENTS

| | | | | |
|---|---|---|---|---|
| 11,415,945 | B2 * | 8/2022 | Kadmiri ................. | G04B 37/22 |
| 11,449,009 | B2 * | 9/2022 | Kadmiri ................. | G04B 37/08 |
| 2012/0327750 | A1 * | 12/2012 | Nakamura ............. | G04G 19/00 368/205 |

* cited by examiner

TIMEPIECE AND TIMEPIECE CASE

CROSS-REFERENCE TO RELATED APPLICATIONS

The entire disclosure of Japanese Patent Application No. 2021-096882 filed on Jun. 9, 2021 is incorporated herein by reference in its entirety.

BACKGROUND OF THE INVENTION

Field of the Invention

The present disclosure relates to a timepiece and a timepiece case.

Description of the Related Art

A timepiece, especially a portable timepiece that requires water and dust proofing properties, houses a drive part and a time display part in a casing (case). The top or the front of the casing is joined to a transparent windshield glass that allows the display content on the display part to be seen from the outside. The joining may be done with a glue.

The glue for joining is usually applied to a part invisible from the outside. In pressing and fixing, the glue, which is fluid before being fixed, slightly spreads beyond the adhesion surface. The glue that has spread into areas visible by a user may deteriorate the appearance. To deal with this, JP S5837586U discloses a technique to prevent undesirable flow of glue beyond the adhesion surface by forming a space on the adhesion surface of the case to the windshield glass so that the space retains the glue.

BRIEF SUMMARY OF THE INVENTION

According to an aspect of the present invention, there is provided a timepiece including: a casing that has an open first end; a light transmission part disposed at the first end; a function part disposed inside the casing; and a glue that adheres the light transmission part to the casing, wherein the casing includes a projection that projects from an inner circumferential surface of the casing toward an inside of the casing and that extends along a circumferential direction and a protrusion that protrudes from the inner circumferential surface toward the inside of the casing and that determines a position of the light transmission part with respect to the inner circumferential surface, wherein a lateral surface of the light transmission part is adhered to the inner circumferential surface by the glue, and a peripheral part of a bottom surface of the light transmission part is adhered to a top surface of the projection by the glue, wherein an outer circumferential surface of the function part extends along an inner surface of the projection, wherein a space is present in a facing region where the projection faces the function part along the light transmission part, wherein in the facing region, the space is wider in a specific section including a position of the protrusion than in a section different from the specific section.

According to another aspect of the present invention, there is provided a timepiece case including a casing that has an open first end, wherein the casing includes: a projection that projects from an inner circumferential surface of the casing toward an inside, that extends along a circumferential direction, and that supports a light transmission part on a top surface of the projection, the light transmission part covering the first end; and a protrusion that protrudes from the inner circumferential surface toward the inside and that determines a position of the light transmission part with respect to the inner circumferential surface, wherein a facing part of the projection along the light transmission part is thinner in a specific section including a position of the protrusion than in a section different from the specific section.

BRIEF DESCRIPTION OF DRAWINGS

The accompanying drawings are not intended as a definition of the limits of the invention but illustrate embodiments of the invention, and together with the general description given below, serve to explain the principles of the invention, wherein.

DETAILED DESCRIPTION OF THE INVENTION

Hereinafter, one or more embodiments will be described with reference to the drawings.

Figure 1:
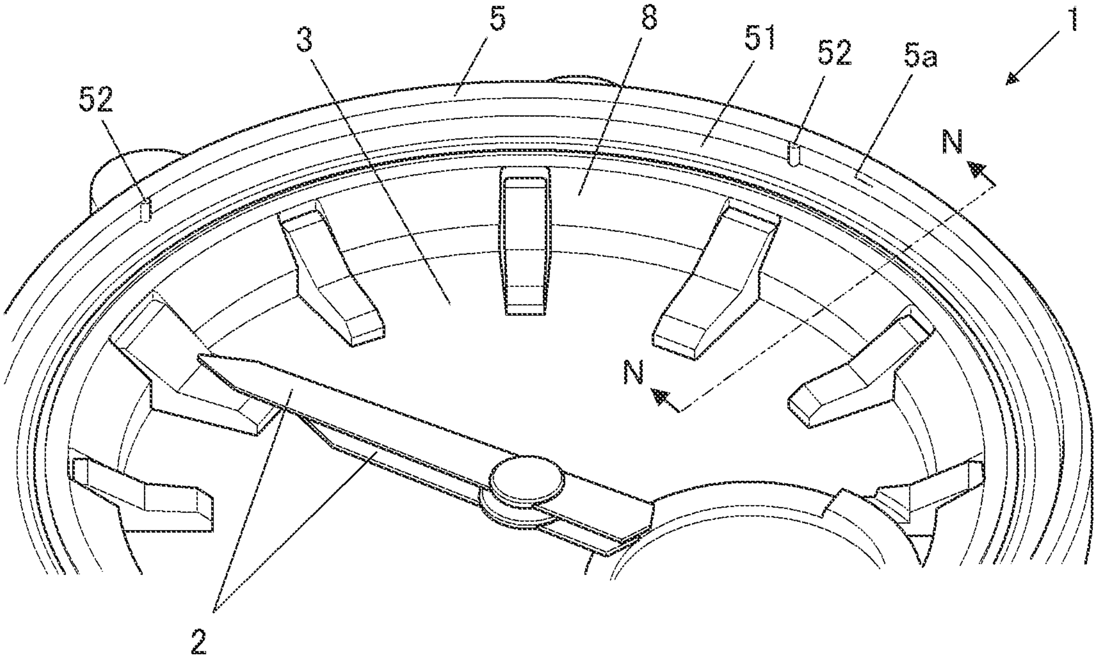
FIG. 1 shows a top view of a timepiece in an embodiment.

FIG. 1 shows a top view of a timepiece 1 in this embodiment.

The timepiece 1 is not limited to a specific type. For example, the timepiece 1 may be a wristwatch that indicates time with hands 2. The timepiece 1 includes a casing 5 (timepiece case), a windshield glass 6 (not illustrated in FIG. 1, see FIG. 2), hands 2 that rotate to indicate time and other information under the windshield glass 6, a dial 3 that is disposed below the hands 2 and that includes non-illustrated indexes, and a parting plate 8 that is substantially loop-shaped and disposed on the dial 3 around the hands 2 along the inner circumferential surface 5*a* of the casing 5. The windshield glass 6 is a part (member) that allows light to pass through (light transmission part). The dial 3, the hands 2, and the parting plate 8 are visible from the outside through the windshield glass 6.

The casing 5 houses various parts (function parts) including the controller of the timepiece 1, the display including the hands 2, the dial 3, the parting plate 8, and a battery. The casing 5 has a tubular shape. Herein, the casing 5 is substantially cylindrical. At least the end at the top surface side (first end) of the casing 5 is open. The material of the casing 5 is not limited to a specific one, as long as the material is appropriately adhered by the glue 7 (described later). For example, the casing 5 herein is made of resin of any kind. The windshield glass 6 covers the open first end of the casing 5.

The various parts housed in the casing 5 include the hands 2.

The end at the bottom surface side of the casing 5, which is opposite the first end, may also be open. The bottom end may be sealed with a not-illustrated back lid, for example.

Figure 2:
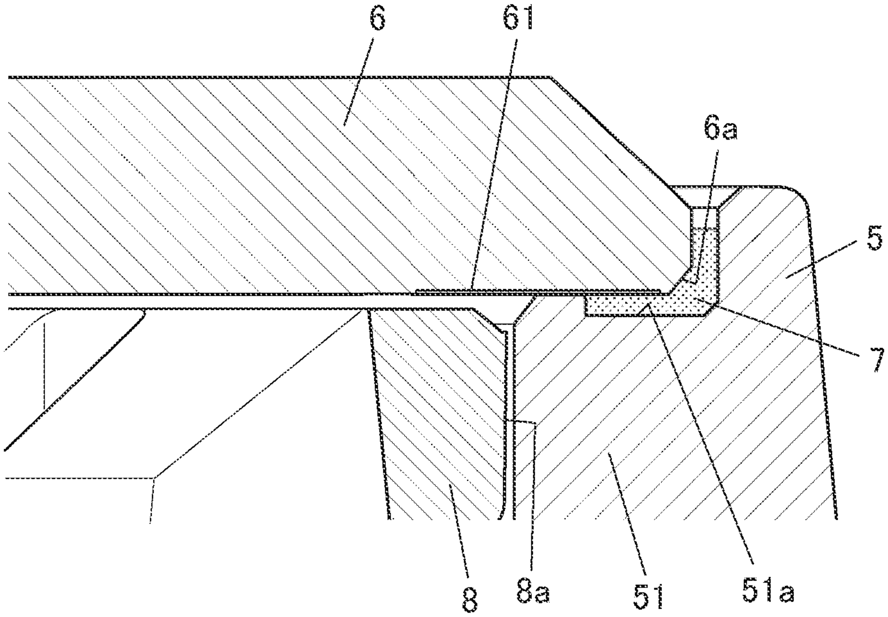
FIG. 2 is a part of a cross section of the timepiece.

FIG. 2 shows part of a cross section of the timepiece 1. The casing 5 has a groove 51*a* on the top surface of the projection 51. The windshield glass 6 is supported by and fixed to the top surface of the projection 51.

The windshield glass 6 includes a loop-shaped thin film 61 (thin film layer) along the periphery of the bottom surface. The thin film 61 is a colored (e.g., silver) film that does not allow light to pass through. The thin film 61 is formed on the windshield glass 6 by printing, for example. The thin film 61 is a screening film that screens (hides) the glue 7 and the structure of the casing 5 disposed under the thin film 61 such that they are invisible from the top surface side of the timepiece 1.

The glue 7 adheres the thin film 61 of the windshield glass 6 (i.e., the peripheral part of the bottom surface of the windshield glass 6) to the top surface of the projection 51. The glue 7 also adheres the lateral surface of the windshield glass 6 to the inner circumferential surface 5*a* above the projection 51. The glue 7 is applied to the groove 51*a*, and most of the glue 7 on the projection 51 remains in the groove 51*a*. A space is present between the lateral surface of the windshield glass 6 and the inner circumferential surface 5*a*. The glue 7 proceeds into the space and remains there. Thus, the groove 51*a* and the space prevent the glue 7 from spreading overly beyond the adhesion surface when the glue 7 is pressed and heated. The glue 7 may not fill the entire space as long as the glue 7 retains a required adhesion strength and provides required waterproofing and dustproofing properties.

The glue 7 is not limited to a specific kind. For example, the glue 7 may be a thermosetting glue. The thermosetting glue may slightly expand (by a few percent) when heated and set. The glue 7 may not be colorless or transparent. The glue 7 may be colored (herein, white is included as a color). The lateral surface of the windshield glass 6 is adhered to the inner circumferential surface 5*a* of the casing 5 by the glue 7. Further, the peripheral part of the bottom surface of the windshield glass 6 is adhered to the top surface of the projection 51 by the glue 7.

The bottom edge of the lateral surface of the windshield glass 6 is chamfered so that the glue 7 can easily spread over the bottom and lateral surfaces of the windshield glass 6 in adhesion. The windshield glass 6 may be chamfered at an angle greater than 45 degrees (i.e., the chamfered surface 6*a* may be angled more sharply with respect to the bottom surface).

The lateral surface at the pointed-end side of the projection 51 (inner surface of the projection 51) faces the outer circumferential surface 8*a* of the parting plate 8 (facing region). The facing region has a space along the windshield glass 6. The inner edge of the thin film 61 of the windshield glass 6 is inside the outer edge of the parting plate 8. A small space may be present between the top surface of the parting plate 8 and the windshield glass 6.

Figure 3A:
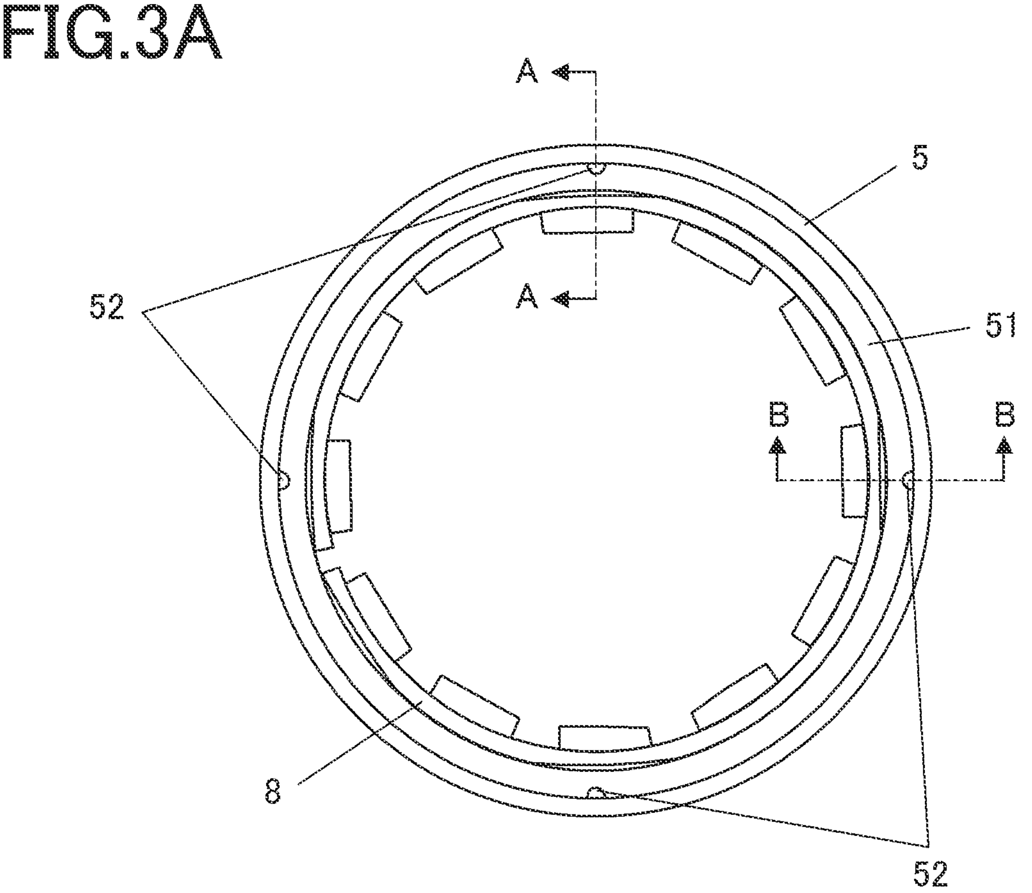
FIG. 3A is a figure to explain the positions of chipped portions.
Figure 3B:
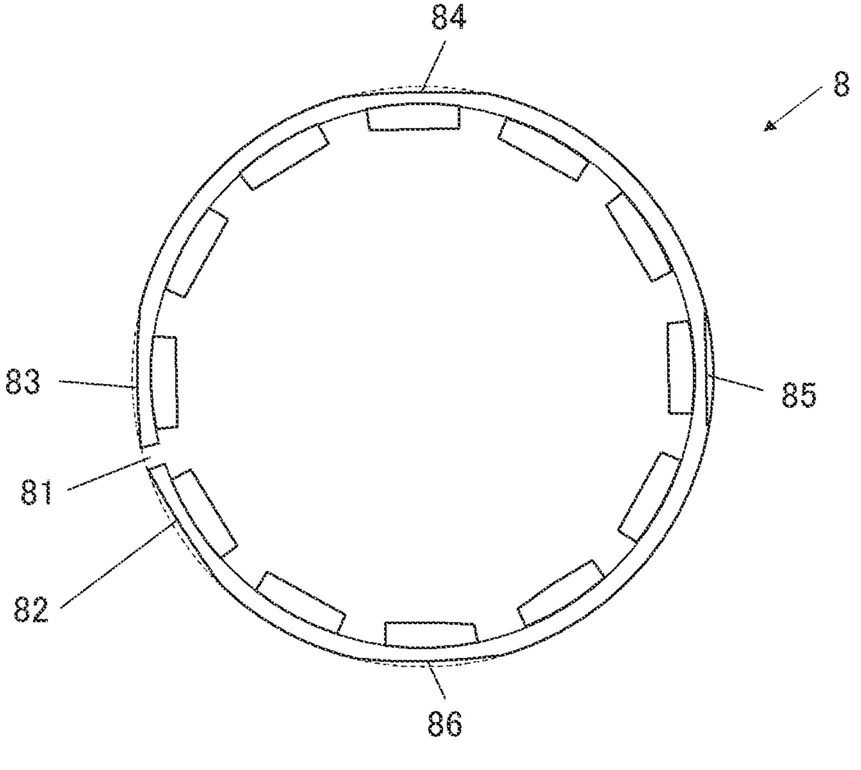
FIG. 3B is a figure to explain the positions of chipped portions.

FIGS. 3A, 3B show figures to explain the positions of chipped portions.

As shown in FIG. 3A, the casing 5 has protrusions 52 that protrude from the inner circumferential surface 5*a*. Herein, four protrusions 52 are formed along the inner circumferential surface 5*a* at a 90-degree angle interval. The circle that passes through the pointed ends of the protrusions 52 is approximately as large as the periphery of the windshield glass 6 (the circle is actually slightly larger than the periphery of the windshield glass 6). The protrusions 52 set the windshield glass 6 to a specific position with respect to the casing 5 (inner circumferential surface 5*a*). The protrusions 52 may be disposed at three or more positions at an interval of an angle smaller than 180 degrees so that the protrusions 52 can determine the circle. There may be one or two protrusions 52 if one or two protrusions 52 are enough to determine the position of the windshield glass 6 depending on the shape or the structure of the windshield glass 6 (e.g., when a protrusion of the windshield glass 6 serves as a third protrusion or when the circumferential surface of the windshield 6 is pressed against and fixed by the two protrusions 52).

According to the above, the distance between the center of the casing 5 and the inner circumferential surface 5*a* in the plan view is partly quite short in the cross section including the protrusion 52. When the windshield glass 6 is adhered to the casing 5, the glue 7 may be pushed out from the narrow space or may expand by heat as described above, thereby spreading into the surrounding area. Especially, in the area inside the groove 51*a* along the bottom surface of the windshield glass 6, the space is narrow between the windshield glass 6 and the projection 51 and between the windshield glass 6 and the parting plate 8. Accordingly, the glue 7 may spread over a wider area toward the inside with respect to the volume of the pushed-out glue 7. The glue 7 that has spread inside the thin film 61 is visible from the outside and deteriorates the appearance.

The parting plate 8 in FIG. 3B is C-shaped with a break 81 in one direction. However, the parting plate 8 may be an unbroken loop. The material of the parting plate 8 is not limited to a specific material. Herein, the parting plate 8 is made of resin.

The parting plate 8 has chipped portions 82 to 86. The chipped portions 82, 83 are formed at both sides of the break 81. The chipped portions 83 to 86 are formed at a 90-degree angle interval. The angular ranges of the respective chipped portions 83 to 86 include the positions (in the angular direction) of the respective protrusions 52 in the plan view. The widths of the respective chipped portions 83 to 86 in the angular direction (the direction along the inner circumferential surface 5*a*) are wider than the width of the protrusion 52 in the angular direction. The cubic volume (capacity) of each of the chipped portions 83 to 86 (the cubic volume of a part cut from the cylindrical parting plate 8 as the chipped portion) is greater than the cubic volume of each of the protrusions 52.

These chipped portions may not be intentionally formed for the protrusions 52 but may be formed for other purposes. For example, the parting plate 8 is usually formed by injection molding, in which resin is injected into a mold and hardened. The channel through which resin is injected, namely the gate, is cut off. The surfaces having the trace of cutting off the gate may be used as the chipped portions 84, 86. When the parting plate 8 with the break 81 is formed by injection molding, both ends of the break 81 may be connected with a connecting channel (bridge). In the case, the surfaces that have the traces of cutting off the bridge and that are adjacent to the break 81 may be used as the chipped portions 82, 83. Herein, "the position adjacent to the break 81" may be referred to as the position corresponding to the break 81, such as the position at a certain distance from the break 81. The distance between the chipped portion and the break 81 may depend on the manufacturing method of the parting plate 8. The shapes of the gate and the bridge may be determined as desired. The chipped portions 82, 83 from which the bridge was cut off may not be on both sides of the break 81. The chipped portions 82, 83 may be separate from the break 81.

Figure 4:
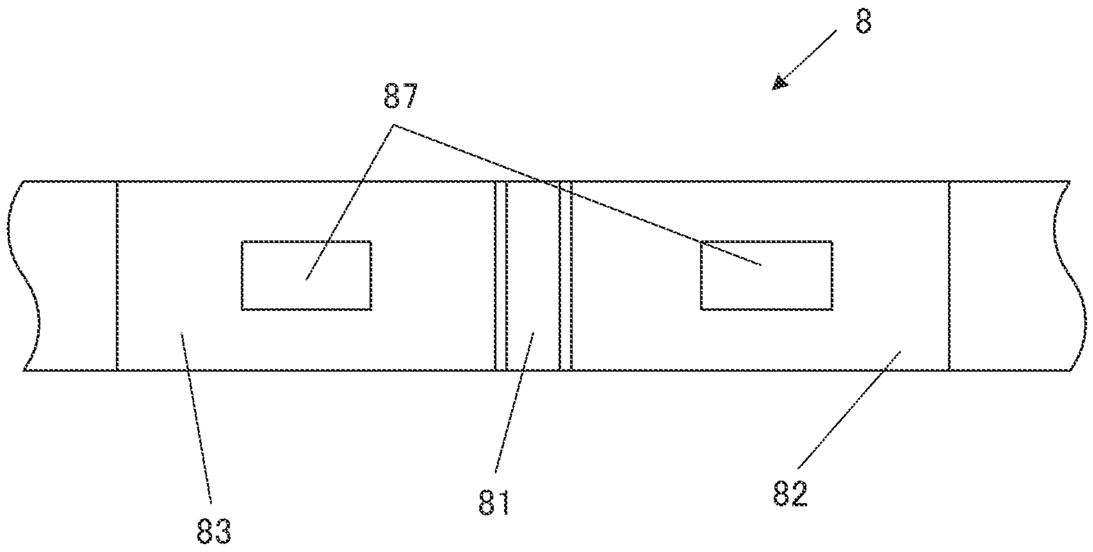
FIG. 4 is a figure to explain the lateral view of a parting plate seen from a break.

FIG. 4 is a figure to explain the lateral view of the parting plate 8 seen from the break 81.

The chipped portions 82, 83 where the bridge was cut off at both ends of the break 81 may have the cut-off traces 87. The cut-off traces 87 may be a rough surface or bumps on the chip surfaces of the chipped portions 82, 83, but the features of the cut-off traces 87 may not be limited to them. Further, the bridge may have any cross-sectional shape and size, for example.

The positional relationship of the gate and the bridge is determined by the direction of the necessary break 81, for example. When the positions of the chipped portions do not correspond with the positions of the protrusions 52 or when more chipped portions are required, further chipped portions 85 may be formed.

Figure 5A:
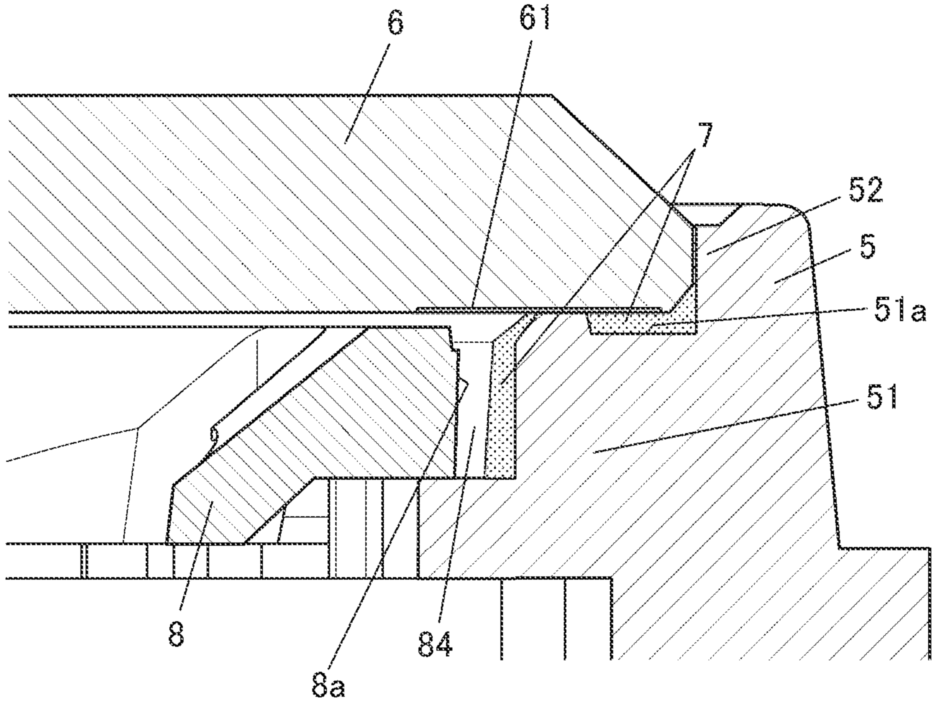
FIG. 5A is a cross section including a protrusion.
Figure 5B:
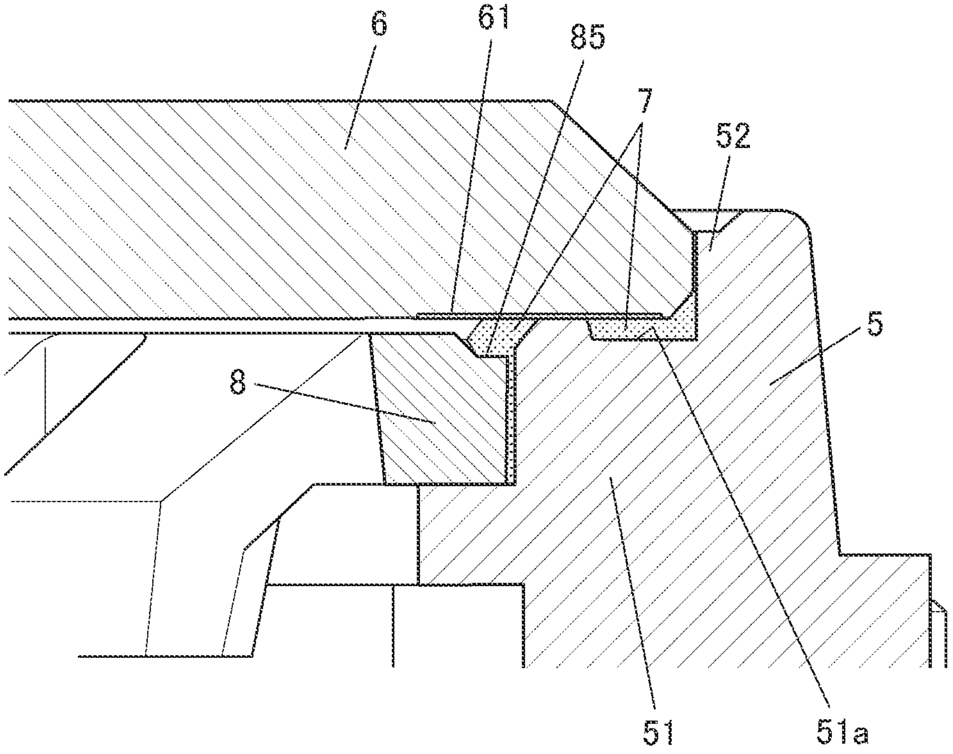
FIG. 5B is a cross section including a protrusion.

FIG. 5A shows the cross section at the A-A line in FIG. 3A. FIG. 5B shows the cross section at the B-B line in FIG. 3A.

The cross section at the A-A line as shown in FIG. 5A includes the protrusion 52 and the chipped portion 84 that has a cut-off trace at the position of the gate. On the outer circumferential surface 8*a* of the parting plate 8 that faces the inner circumferential surface 5*a*, the surface (chip surface) of the chipped portion 84 may be flat (straight line in the plan view). In the cross section including the chipped portion 84, a space is present between the inner surface of the projection 51 and the outer circumferential surface 8*a* of the parting plate 8. The space has the height corresponding to the height of the outer circumference of the parting plate 8. The cross section including the chipped portion 86 may have the same structure. The cross section including the chipped portion 82, which has the trace of the bridge, may also have the same structure. There is no need to distinguish between the gate trace and the bridge trace. As the angle of the chipped portion 83 is not so different from the angle of the chipped portion 82, the chipped portion 83 of the parting plate 8 does not correspond with any protrusion 52. However, the casing 5 may have a protrusion 52 that corresponds with the chipped portion 83.

The cross section at the B-B line as shown in FIG. 5B includes the protrusion 52 and the chipped portion 85 that does not have a cut-off trace of the gate. Herein, the cross section at the chipped portion 85 is different from the cross section at the chipped portion 84. The shapes of these cross sections are not limited to particular shapes. For the chipped portion 85, the parting plate 8 is not thoroughly chipped in the top-bottom direction, but only a part around the top surface of the parting plate 8 is chipped. The chipped portion may have such a shape as long as the chipped portion has a capacity to fully receive the glue 7 spreading along the bottom surface toward the center of the windshield glass 6.

With the chipped portions 82 to 86, the space along the bottom surface of the windshield glass 6 in the facing region, where the inner surface of the projection 51 faces the parting plate 8, become partially wider. Specifically, the space is wider in specific sections that include the respective protrusions 52 in a plan view (in an angular direction) than in sections different from the specific sections. In the angular range including each protrusion 52, the gap between the inner circumferential surface 5*a* and the windshield glass 6 is narrow because of the protrusion 52. In such angular ranges, the chipped portions 82 to 86 widen the space so that the space receives the glue 7 pushed out of the narrow gap between the inner circumferential surface 5*a* and the windshield glass 6 and restrains the glue 7 from spreading further toward the center of the windshield glass 6. Thus, the glue 7 can be restrained from spreading inside the thin film 61 and becoming visible from the outside.

[Modification]

Figure 6:
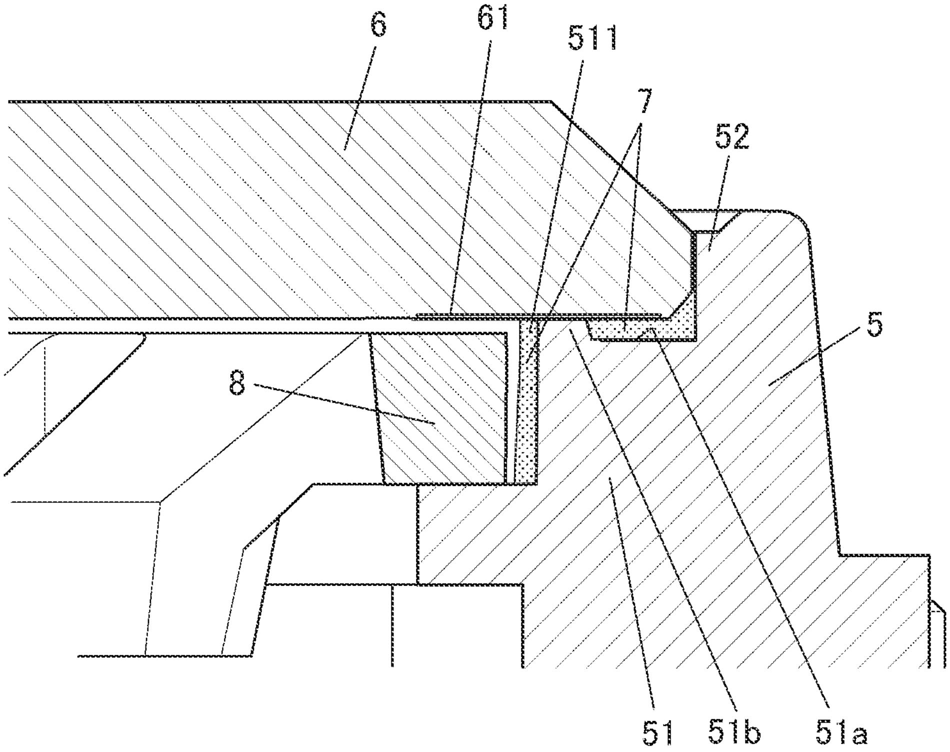
FIG. 6 is a cross section of a modification of the timepiece in the embodiment.

FIG. 6 is a cross section of a modification of the timepiece 1 in this embodiment.

The cross section in FIG. 6 includes the same protrusion 52 as in the cross section in FIG. 5B. Like elements are denoted by like reference numerals and not described herein.

In this modification, the parting plate 8 does not have a chipped portion in the cross section including the protrusion 52. Instead, the projection 51 of the casing 5 has a chipped portion 511. The projection width of the projection 51 at the chipped portion 511 is narrower than the projection width thereof at the other parts. Either the parting plate 8 or the projection 51 may have the chipped portion as a space as long as the space between the parting plate 8 and the projection 51 is partially wide along the windshield glass 6.

Herein, the chipped portion 511 is formed only at a part inside the inner edge part 51*b* of the groove 51*a*. However, the chipped portion 511 may be formed by narrowing the width of the edge 51*b* or partly removing the edge 51*b*.

As described above, the timepiece 1 according to the embodiment includes: the casing 5 that has an open first end (end at the top surface side); the windshield glass 6 as a light transmission part disposed at the first end; the parting plate 8 as a function part disposed inside the casing 5; and the glue 7 that adheres the windshield glass 6 to the casing 5. The casing 5 includes: the projection 51 that projects from the inner circumferential surface 5*a* toward the inside of the casing 5 and that extends along the circumferential direction; and the protrusion(s) 52 that protrudes from the inner circumferential surface toward the inside and that determines the position of the windshield glass 6 with respect to the inner circumferential surface 5*a*. The lateral surface of the windshield glass 6 is adhered to the inner circumferential surface 5*a* by the glue 7, and the peripheral part of the bottom surface of the windshield glass 6 is adhered to the top surface of the projection 51 by the glue 7. The outer circumferential surface 8*a* of the parting plate 8 extends along the inner surface of the projection 51. In the facing region where the projection 51 faces the parting plate 8 along the windshield glass 6, a space is present. In the facing region, the space is wider in specific sections including the positions of the respective protrusions 52 (specific sections including the chipped portions 83 to 86) than in sections different from the specific sections.

Thus, the timepiece 1 has spaces corresponding with the protrusions 52. Such a timepiece 1 allows easy and accurate positioning of the windshield glass 6 and restrains spread of the glue 7 into areas where no glue is required. Thus, deterioration of appearance is restrained.

Further, the space in the specific sections may be formed by chipping the parting plate 8 (chipped portions 83 to 86). The spread of the glue 7 inside the thin film 61 depends on the position and shape of the parting plate 8 (function part). Therefore, the space is adjusted by adjusting the parting plate 8. This can reduce the number of shape patterns of the casing 5 for various products.

Further, the width of each of the chipped portions 82 to 86 in a direction along the inner circumferential surface 5*a* may be wider than the width of the protrusion 52 in the direction along the inner circumferential surface 5*a*. Such a structure allows the glue 7 to more easily spread in the circumferential direction in adhesion and allows thinner chipped portions 82 to 86. This can minimize the effect on the features of the timepiece 1 (e.g., size of the display screen).

Further, the capacity of the space in the specific section may be greater than a volume of the corresponding protrusion. According to such a feature, the chipped portions 83 to 86 do not overflow even when they receive the whole glue 7 pushed out by the volume of the protrusions 52. Thus, the chipped portions 83 to 86 can more properly restrain the spread of the glue 7 toward the inside of the thin film 61.

Further, the surface of the chipped portions 83 to 86 of the parting plate 8 may be made of resin, and at least part of the surface of the chipped portions 83 to 86 may have the cut-off trace 87. That is, there is no need to form all the chipped portions 83 to 86 on purpose to retain the glue 7. The parts that were formed for the gate and bridge and from which the gate and bridge were cut off may be efficiently used as spaces for retaining the glue 7.

Further, the parting plate 8 may have the break 81 in a direction along the pointed-end side surface (inner surface) of the projection 51, and the parting plate 8 may have the chipped portions 82, 83 at positions corresponding to the break 81 (e.g., at positions adjacent to the break 81). That is, the parting plate 8 may not necessarily be loop-shaped, depending on the functions thereof and the positional relationship with other components. The break 81 may positionally correspond with the protrusion 52. However, when the break 81 positionally corresponds with a component other than the protrusion 52, the parts adjacent to the break 81 (mostly the parts from which the bridge was cut off) may be used.

Further, the windshield glass 6 may include the loop-shaped thin film 61 along the adhesion surface adhered to the top surface of the projection 51, and the glue 7 adheres the thin film 61 to the top surface of the projection 51. According to this feature, the glue 7 is applied to the thin film 61 instead of being directly applied to the bottom surface of the windshield glass 6. The glue 7 therefore does not affect the display surface with the hands 2 under the windshield glass 6. Further, the thin film 61 can screen and hide the glue 7, thereby improving the appearance of the timepiece 1.

Further, even when the glue 7 is a colored glue, which is easily seen from the top surface side, the glue 7 is prevented from spreading inside the thin film 61. Thus, the glue 7 is appropriately restrained from deteriorating the appearance of the timepiece 1.

Further, the protrusion 52 may be disposed between the projection 51 and the first end. Such a structure can stably support the windshield glass 6. The structure also allows the glue 7 pushed out from the gap between the inner circumferential surface **5*a* and the windshield glass 6 to appropriately flow into the space between the projection 51 and the outer circumferential surface 8*a*** and remain in the space.

Further, the timepiece case includes the casing 5 that has the open first end (end at the top surface side). The casing 5 includes: the projection 51 that projects from the inner circumferential surface **5*a* toward the inside of the casing 5, that extends along the circumferential direction, and that supports the windshield glass 6 on the top surface of the projection 51, the windshield glass 6 covering the first end; and the protrusions 52 that protrude from the inner circumferential surface 5*a* toward the inside and that determine the position of the windshield glass 6 with respect to the inner circumferential surface 5*a*. The facing part of the projection 51 along the windshield glass 6 is thinner in a specific section including the position of the protrusion (including the chipped portion 511**) than in a section different from the specific section.

Thus, the chipped portion 511 may be formed on the casing 5. The chipped portion 511 can restrain the glue 7 from spreading toward the inside along the bottom surface of the windshield glass 6 when the windshield glass 6 is adhered by the glue 7. The glue 7 is thus restrained from becoming visible from the top surface side through the windshield glass 6. This restrains deterioration of the appearance of the timepiece 1.

The above embodiment does not limit the present invention and can be variously modified.

For example, in the above embodiment, the chipped portions 83 to 86 correspond with the protrusions 52 in a one-to-one relationship. However, one chipped portion may correspond with multiple protrusions 52 when some protrusions 52 are arranged at a narrow interval. In the case, preferably, the chipped portion may have a capacity greater than the total volume of the some protrusions 52.

In the above embodiment, the chipped portions 82 to 86, which are spaces for retaining the glue 7, are formed by cutting off the gate and/or bridge from the resin parting plate 8. However, all the chipped portions 82 to 86 may be formed as dedicated spaces for retaining the glue 7. For example, when the parting plate 8 (function part) is made of metal instead of resin, the parting plate 8 has no trace of the gate/bridge. In the case, all the chipped portions may be individually formed on purpose to retain the glue 7.

The number of chipped portions (82 to 86) and the interval between the chipped portions may be determined as desired within the range of enabling determination of the position of the windshield glass 6. The chipped portions 82 to 86 may have different shapes and sizes.

The chip surfaces of the chipped portions 82 to 86 may not be flat in a planar view. The chip surfaces may be curved (e.g., concave or convex).

The capacity of each of the chipped portions 82 to 86 may not necessarily be greater than the volume of the protrusion 52 because the glue 7 pushed out by the protrusions 52 may not entirely flow into the chipped portions 82 to 86. The width of each chipped portion in the circumferential direction may be narrower than the width of the corresponding protrusion 52 as long as the chipped portion has a required capacity.

The color of the glue 7 is not limited to a specific color. The glue 7 may be colorless and transparent. Further, the adhesion surface of the thin film 61 to the windshield glass 6 may be colored as desired according to the design of the timepiece 1 seen from the top surface side, for example. The glue 7 may not be a thermosetting glue or a glue that expands when heated and hardened.

Although the timepiece 1 in the above embodiment indicates time with the hands 2, the timepiece 1 may have a digital display. The timepiece 1 is not limited to an electronic timepiece. The timepiece 1 may be a mechanical timepiece using springs, for example. Further, the timepiece 1 may not be a device dedicated for indication of time. The timepiece 1 may have basic functions, such as stopwatch and alarm functions. The timepiece 1 may be a multifunctional device (e.g., smartwatch) that includes a physical sensor for sensing atmospheric pressure, geomagnetic field, temperature, acceleration, and optical parameters and that is capable of measuring/obtaining and displaying temperatures, compass directions, altitudes, changes in weather condition, the usage state, the user's activity, pulses, and SpO2. The timepiece 1 may further be capable of obtaining various kinds of external information via a communication unit to perform display and notification. The timepiece 1 is not limited to a wristwatch attachable to the wrist. The timepiece 1 may be a device attachable to other parts of the body or may be a pocket watch portable in a pocket.

The open ends of the casing 5 and the external shape of the windshield glass 6 may not be round. They may have an oval shape or a polygonal shape the corners of which are rounded or cut away. The external shape of the windshield glass 6 may be different from the external shape of the parting plate 8. For example, the timepiece 1 with a digital display may have the parting plate 8 the shape of which corresponds with the digital display.

Although the function part in the above embodiment is the parting plate 8 as an example, the function part is not limited thereto. When the dial 3 is in direct contact with the projection 51 of the casing 5, the dial 3 may be the function part. Any other parts for other purposes may be the function part.

The detailed configurations, contents and orders of the steps in the processes, and so forth shown in the above embodiment can be appropriately modified without departing from the scope of the present disclosure.

Although some embodiments have been described, the scope of the present invention is not limited to the embodiments described above but encompasses the scope of the invention recited in the claims and the equivalent thereof.

What is claimed is:

1. A timepiece comprising:

a casing that has an open first end;

a light transmission part disposed at the first end;

a function part disposed inside the casing; and a glue that adheres the light transmission part to the casing, wherein the casing includes a projection that projects from an inner circumferential surface of the casing toward an inside of the casing and that extends along a circumferential direction and a protrusion that protrudes from the inner circumferential surface toward the inside of the casing and that determines a position of the light transmission part with respect to the inner circumferential surface, wherein a lateral surface of the light transmission part is adhered to the inner circumferential surface by the glue, and a peripheral part of a bottom surface of the light transmission part is adhered to a top surface of the projection by the glue, wherein an outer circumferential surface of the function part extends along an inner surface of the projection, wherein a space is present in a facing region where the projection faces the function part along the light transmission part, wherein in the facing region, the space is wider in a specific section including a position of the protrusion than in a section different from the specific section.

2. The timepiece according to claim 1, wherein the space in the specific section is formed by chipping the function part.

3. The timepiece according to claim 2, wherein a width of the chipped portion in a direction along the inner circumferential surface is wider than a width of the protrusion in the direction along the inner circumferential surface.

4. The timepiece according to claim 3, wherein a surface of the chipped portion of the function part is made of resin, and at least part of the surface of the chipped portion has a cut-off trace.

5. The timepiece according to claim 3, wherein the function part has a break in a direction along the inner surface of the projection, and the function part has the chipped portion at a position corresponding with the break.

6. The timepiece according to claim 2, wherein a surface of the chipped portion of the function part is made of resin, and at least part of the surface of the chipped portion has a cut-off trace.

7. The timepiece according to claim 6, wherein the function part has a break in a direction along the inner surface of the projection, and the function part has the chipped portion at a position corresponding with the break.

8. The timepiece according to claim 2, wherein the function part has a break in a direction along the inner surface of the projection, and the function part has the chipped portion at a position corresponding with the break.

9. The timepiece according to claim 1, wherein a capacity of the space in the specific section is greater than a volume of the corresponding protrusion.

10. The timepiece according to claim 1, wherein the light transmission part includes a thin film layer along an adhesion surface adhered to the top surface of the projection, and the glue adheres the thin film layer to the top surface of the projection.

11. The timepiece according to claim 1, wherein the glue is colored.

12. The timepiece according to claim 1, wherein the protrusion is disposed between the projection and the first end.

13. The timepiece according to claim 1, wherein the timepiece includes two or more protrusions each of which is the protrusion.

14. A timepiece case comprising a casing that has an open first end, wherein the casing includes:

a projection that projects from an inner circumferential surface of the casing toward an inside, that extends along a circumferential direction, and that supports a light transmission part on a top surface of the projection, the light transmission part covering the first end; and a protrusion that protrudes from the inner circumferential surface toward the inside and that determines a position of the light transmission part with respect to the inner circumferential surface, wherein a facing part of the projection along the light transmission part is thinner in a specific section including a position of the protrusion than in a section different from the specific section.

* * * * *